US011334637B2

(12) United States Patent
Oberdorfer et al.

(10) Patent No.: US 11,334,637 B2
(45) Date of Patent: May 17, 2022

(54) DYNAMIC JOURNEY MAPPING AND RECORDKEEPING

(71) Applicant: Blazer and Flip Flops, Inc., San Diego, CA (US)

(72) Inventors: Matthias Oberdorfer, La Mesa, CA (US); Benjamin Keeling Mathews, Orlando, FL (US); Scott Sahadi, San Diego, CA (US)

(73) Assignee: Blazer and Flip Flops, Inc., San Diego, CA (US)

( * ) Notice: Subject to any disclaimer, the term of this patent is extended or adjusted under 35 U.S.C. 154(b) by 39 days.

(21) Appl. No.: 15/913,402

(22) Filed: Mar. 6, 2018

(65) Prior Publication Data

US 2018/0349393 A1 Dec. 6, 2018

Related U.S. Application Data

(60) Provisional application No. 62/467,687, filed on Mar. 6, 2017.

(51) Int. Cl.
*G06F 16/30* (2019.01)
*H04W 4/021* (2018.01)
(Continued)

(52) U.S. Cl.
CPC ......... *G06F 16/9537* (2019.01); *G01C 21/00* (2013.01); *G01C 21/005* (2013.01);
(Continued)

(58) Field of Classification Search
CPC ..... G01C 21/005; G01C 21/00; H04W 4/021; G06F 16/9537; G06F 16/29; G06F 16/58;
(Continued)

(56) References Cited

U.S. PATENT DOCUMENTS 10,433,106 B2   10/2019   Sahadi
10,438,141 B2   10/2019   Sahadi
(Continued)

FOREIGN PATENT DOCUMENTS

EP         3 593 088        1/2020
WO     WO 2018/165147       9/2018

OTHER PUBLICATIONS

PCT Application No. PCT/US2018/021130 International Search Report and Written Opinion dated Jun. 26, 2018.
(Continued)

*Primary Examiner* — Kuen S Lu (57) ABSTRACT

Journey information is mapped by first identifying an acceptable trigger condition type, such as a photo trigger condition type, of a plurality of trigger condition types. Once a journey has begun, a trigger condition of the acceptable trigger condition type may be detected at a mobile computing device, for example when the mobile computing device captures a photo. A location of the mobile computing device is then identified in response to the detection of the trigger condition, and a marker is placed on a map identifying the location. The marker is also associated with data associated with the trigger condition, for example by allowing the photo captured by the mobile computing device to be viewable at the marker.

20 Claims, 7 Drawing Sheets (51) Int. Cl.
G06F 16/9537 (2019.01)
G06F 16/29 (2019.01)
G06F 16/58 (2019.01)
G06F 16/78 (2019.01)
G06F 16/9535 (2019.01)
G01C 21/00 (2006.01)
G06Q 30/02 (2012.01)
G06Q 50/00 (2012.01)

(52) U.S. Cl.
CPC .............. G06F 16/29 (2019.01); G06F 16/58 (2019.01); G06F 16/78 (2019.01); G06F 16/9535 (2019.01); G06Q 30/02 (2013.01); G06Q 30/0201 (2013.01); G06Q 30/0241 (2013.01); G06Q 30/0261 (2013.01); G06Q 50/01 (2013.01); H04W 4/021 (2013.01)

(58) Field of Classification Search
CPC ..... G06F 16/9535; G06F 16/78; G06Q 50/01; G06Q 30/02; G06Q 30/0201; G06Q 30/0241; G06Q 30/0261
USPC .......................................... 715/736; 707/736
See application file for complete search history.

(56) References Cited

U.S. PATENT DOCUMENTS

| | | | |
|---|---|---|---|
| 10,733,544 B2 | 8/2020 | Sahadi | |
| 11,030,266 B2 | 6/2021 | Sahadi | |
| 2002/0128768 A1 | 9/2002 | Nakano et al. | |
| 2003/0102956 A1 | 6/2003 | McManus et al. | |
| 2004/0218910 A1 | 11/2004 | Chang | |
| 2006/0149459 A1* | 7/2006 | Matsuura | G01C 21/3484 701/540 |
| 2007/0129082 A1 | 6/2007 | Thacher | |
| 2008/0045138 A1 | 2/2008 | Milic-Frayling et al. | |
| 2008/0306826 A1 | 12/2008 | Kramer et al. | |
| 2010/0106801 A1* | 4/2010 | Bliss | G06F 16/9537 709/219 |
| 2010/0225469 A1 | 9/2010 | Yoshioka et al. | |
| 2011/0046881 A1 | 2/2011 | Karaogz | |
| 2011/0307547 A1 | 12/2011 | Backer et al. | |
| 2012/0064919 A1 | 3/2012 | Purdy | |
| 2012/0116863 A1 | 5/2012 | Boss et al. | |
| 2013/0024203 A1 | 1/2013 | Flores et al. | |
| 2013/0036134 A1* | 2/2013 | Neven | G06K 9/00295 707/769 |
| 2013/0158860 A1* | 6/2013 | Gum | H04W 52/0267 701/410 |
| 2014/0274136 A1* | 9/2014 | Edge | H04W 4/30 455/456.2 |
| 2014/0280060 A1 | 9/2014 | Campbell et al. | |
| 2014/0324488 A1 | 10/2014 | Boccelli | |
| 2014/0358632 A1 | 12/2014 | Graff et al. | |
| 2015/0081348 A1 | 3/2015 | Avera et al. | |
| 2015/0081617 A1 | 3/2015 | Shaik et al. | |
| 2015/0088622 A1 | 3/2015 | Ganschow | |
| 2015/0241238 A1 | 8/2015 | Bass et al. | |
| 2015/0324400 A1 | 11/2015 | Sheck et al. | |
| 2016/0021507 A1 | 1/2016 | Gaines | |
| 2016/0093334 A1 | 3/2016 | Kim et al. | |
| 2016/0116292 A1 | 4/2016 | An | |
| 2016/0155310 A1 | 6/2016 | Joao et al. | |
| 2016/0191666 A1* | 6/2016 | Roireau | A63F 13/213 709/217 |
| 2016/0307265 A1 | 10/2016 | Seaward et al. | |
| 2016/0330290 A1 | 11/2016 | Flores et al. | |
| 2016/0353235 A1 | 12/2016 | Williams et al. | |
| 2016/0353249 A1 | 12/2016 | Khatam et al. | |
| 2017/0045364 A1* | 2/2017 | Trivedi | G01C 21/3679 |
| 2017/0048664 A1 | 2/2017 | Zhang et al. | |
| 2017/0054849 A1 | 2/2017 | Torre et al. | |
| 2017/0178034 A1 | 6/2017 | Skeen et al. | |
| 2017/0178084 A1 | 6/2017 | Barreira Avegliano et al. | |
| 2017/0180488 A1 | 6/2017 | Goldstein | |
| 2017/0270734 A1 | 9/2017 | Geraghty et al. | |
| 2017/0343361 A1* | 11/2017 | Kandangath | G01C 21/165 |
| 2017/0353582 A1 | 12/2017 | Zavesky et al. | |
| 2018/0032997 A1* | 2/2018 | Gordon | G06Q 30/0269 |
| 2018/0033077 A1 | 2/2018 | Villatoro et al. | |
| 2018/0240151 A1 | 8/2018 | D'Andrea et al. | |
| 2018/0349808 A1 | 12/2018 | Sahadi | |
| 2018/0352373 A1 | 12/2018 | Sahadi | |
| 2018/0352378 A1 | 12/2018 | Sahadi | |
| 2019/0095454 A1 | 3/2019 | Sahadi | |
| 2019/0347911 A1 | 11/2019 | Linguanti et al. | |

OTHER PUBLICATIONS

U.S. Appl. No. 15/980,733 Office Action dated Nov. 21, 2018.
U.S. Appl. No. 15/828,120, Scott Sahadi, Development, Deployment and Real Time Management of Highly Personalized Experiences Occurring at Managed Locations, filed Nov. 30, 2017.
U.S. Appl. No. 15/980,733, Scott Sahadi, Personalized Itinerary Generation and Mapping System, filed May 15, 2018.
U.S. Appl. No. 16/010,349, Scott Sahadi, Venue Traffic Flow Management, filed Jun. 15, 2018.
U.S. Appl. No. 16/010,355, Scott Sahadi, Assisted Venue Staff Guidance, filed Jun. 15, 2018.
U.S. Appl. No. 16/008,564, Scott Sahadi, Venue Recommendations Based on Shared Guest Traits, filed Jun. 14, 2018.
U.S. Appl. No. 16/010,349 Final Office Action dated Jan. 11, 2019.
U.S. Appl. No. 16/010,355 Office Action dated Feb. 26, 2019.
PCT Application No. PCT/US2018/021130 International Preliminary Report on Patentability dated Jun. 26, 2018.
U.S. Appl. No. 16/010,355 Final Office Action dated Jul. 12, 2019.
Cheng et al.; "The Adaptive Recommendation Mechanism for Distributed Group in Mobile Environments", IEEE Transactions on Systems, Man, and Cybernetics-Part C: Applications and Reviews, vol. 42, No. 6, Nov. 2012.
U.S. Appl. No. 16/596,141, Scott Sahadi, Venue Traffic Flow Management, filed Oct. 8, 2019.
European Application No. 18763222.9 Extended European Search Report dated Dec. 16, 2020.
PCT Application No. PCT/US2018/021130 International Preliminary Report on Patentability dated Sep. 10, 2019; 6 pages.
U.S. Appl. No. 16/008,564 Office Action dated Jul. 9, 2020.
U.S. Appl. No. 17/341,995, Scott Sahadi, Venue Recommendations Based on Shared Guest Traits, filed Jun. 8, 2021.

* cited by examiner

DYNAMIC JOURNEY MAPPING AND RECORDKEEPING

CROSS-REFERENCE TO RELATED APPLICATIONS

The present application claims the priority benefit of U.S. provisional patent application 62/467,687 filed Mar. 6, 2017, the disclosure of which is incorporated herein by reference.

BACKGROUND

1. Field of the Invention

The present invention generally relates to location tracking. The present invention more specifically relates to a tracking a journey based on detected trigger conditions.

2. Description of the Related Art

When taking a trip, such as a vacation, individuals often take photos, purchase food and gifts, send and receive messages, and post on social media platforms. Typically, records of each of these different events—that is, the resulting photos, messages, transaction receipts, and social media posts—are isolated from each other. Photos are typically isolated on multiple cameras or camera phone devices; transaction receipts are typically isolated in paper form or in a financial software application; and social media posts are typically isolated in a social media platform software application. There is currently no way for an individual to view a cohesive summary of his or her journey.

SUMMARY OF THE PRESENTLY CLAIMED INVENTION

A first claimed embodiment of the present invention concerns a method of mapping journey information. The method includes receiving a setting via a user interface of a mobile computing device associated with a first user, the setting identifying an acceptable trigger condition type of a plurality of trigger condition types. The method includes identifying that a journey associated with the first user has begun and detecting that a trigger condition of the acceptable trigger condition type has occurred at the mobile computing device. The method includes receiving data associated with the trigger condition from the mobile computing device and identifying a first location of the mobile computing device in response to detection that the trigger condition has occurred. The method includes generating a map of a geographic region that includes the first location of the mobile computing device. The method includes generating a dynamic map by overlaying a first marker on the map at the first location of the mobile computing device, and by associating the first marker with the data associated with the trigger condition, so that the data associated with the trigger condition is viewable at the marker.

A second claimed embodiment of the present invention concerns a system for mapping journey information. The system includes a communication interface communicatively coupled to a mobile computing device via a network connection, the mobile computing device associated with a first user. The system also includes a memory that stores instructions and a processor, wherein execution of the instructions by the processor causes the system to perform various system operations. The system operations include receiving a setting from the mobile computing device, the setting identifying an acceptable trigger condition type of a plurality of trigger condition types. The system operations include identifying that a journey associated with the first user has begun and detecting that a trigger condition of the acceptable trigger condition type has occurred at the mobile computing device. The system operations include receiving data associated with the trigger condition from the mobile computing device and identifying a first location of the mobile computing device in response to detection that the trigger condition has occurred. The system operations include generating a map of a geographic region that includes the first location of the mobile computing device. The system operations include generating a dynamic map by overlaying a first marker on the map at the first location of the mobile computing device, and by associating the first marker with the data associated with the trigger condition, so that the data associated with the trigger condition is viewable at the marker.

A third-claimed embodiment of the present invention concerns non-transitory computer readable storage medium having embodied thereon a program, wherein the program is executable by a processor to perform a method of mapping journey information. The method includes receiving a setting via a user interface of a mobile computing device associated with a first user, the setting identifying an acceptable trigger condition type of a plurality of trigger condition types. The method includes identifying that a journey associated with the first user has begun and detecting that a trigger condition of the acceptable trigger condition type has occurred at the mobile computing device. The method includes receiving data associated with the trigger condition from the mobile computing device and identifying a first location of the mobile computing device in response to detection that the trigger condition has occurred. The method includes generating a map of a geographic region that includes the first location of the mobile computing device. The method includes generating a dynamic map by overlaying a first marker on the map at the first location of the mobile computing device, and by associating the first marker with the data associated with the trigger condition, so that the data associated with the trigger condition is viewable at the marker.

DETAILED DESCRIPTION

Journey information is mapped by first identifying an acceptable trigger condition type, such as a photo trigger condition type, of a plurality of trigger condition types. Once a journey has begun, a trigger condition of the acceptable trigger condition type may be detected at a mobile computing device, for example when the mobile computing device captures a photo. A location of the mobile computing device is then identified in response to the detection of the trigger condition, and a marker is placed on a map identifying the location. The marker is also associated with data associated with the trigger condition, for example by allowing the photo captured by the mobile computing device to be viewable at the marker.

Journeys may include individual routes, group routes, individual itineraries or schedules, group itineraries or schedules, or some combination thereof.

Figure 1:
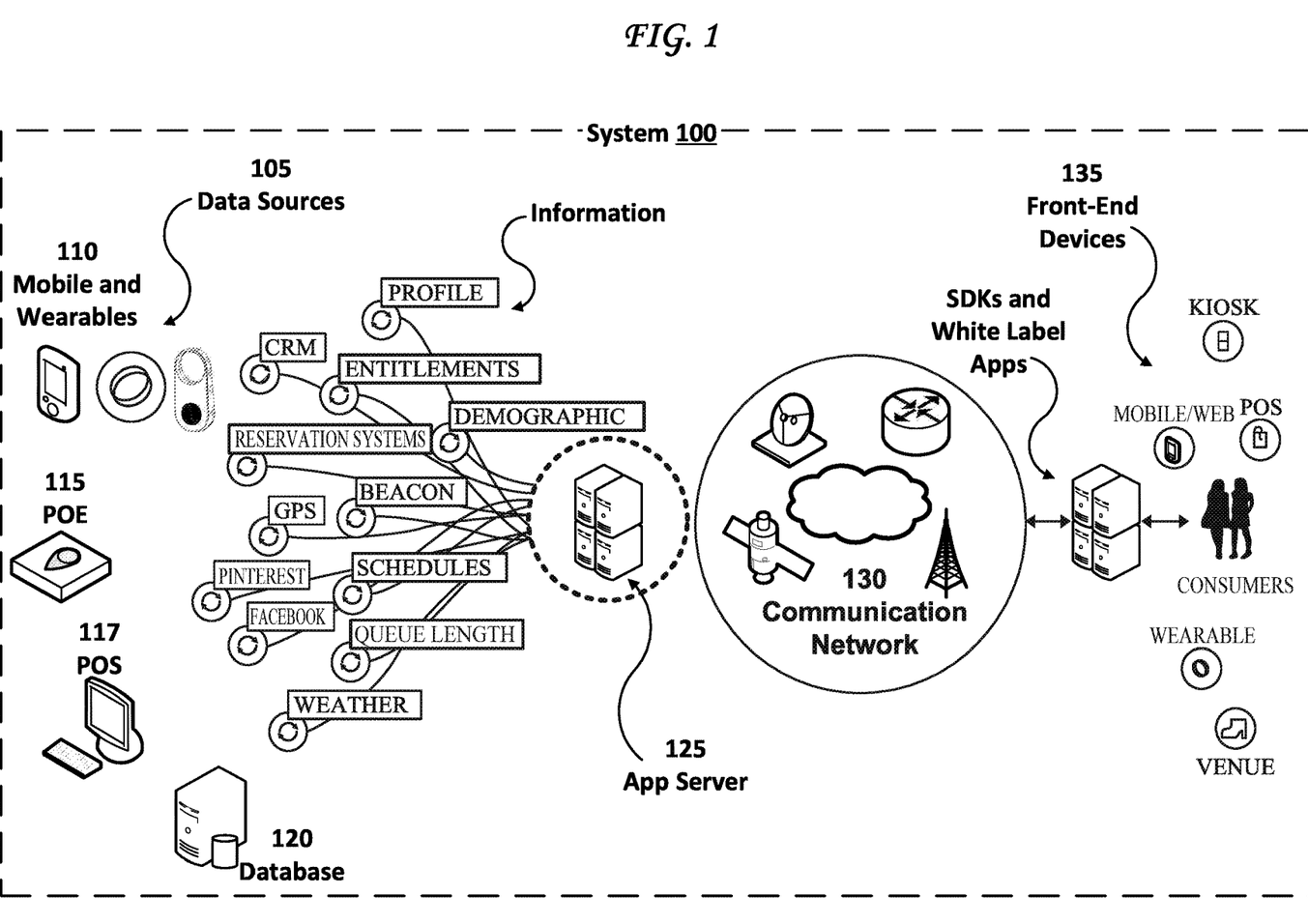
FIG. 1 illustrates a system for dynamic journey mapping and recordkeeping.

FIG. 1 illustrates a system 100 for dynamic journey mapping and recordkeeping, including customer monetization. The system 100 of FIG. 1 includes an ecosystem of data sources 105 such as mobile devices 110, point-of-sale (POS) terminals 117, point-of-entry/-exit (POE) terminals 115, and databases 120. Communicatively coupled to data sources 105 are back-end application servers 125. In system 100, application servers 125 can ingest, normalize and process data collected from mobile devices 110 and various POS or POE terminals 115. Types of information gathered from data sources 105 and processed by back-end application servers 125 are generally inclusive of identity (e.g., user profiles, CRM data, entitlements, demographics, reservation systems and social media sources like Pinterest and Facebook), proximity (e.g., GPS and beacons), and time (e.g., schedules, weather, and queue length).

Mobile devices 110 can execute an application on a user mobile device that shares customer engagement data such as current and prior physical locale within a venue as well as wait times and travel times (e.g., how long was a customer at a particular point in a venue and how long did it take the customer to travel to a further point in a venue). Mobile devices 110 are inclusive of wearable devices. Wearable devices (or 'wearables') are any type of mobile electronic device that can be worn on the body or attached to or embedded in clothes and accessories of an individual. Processors and sensors associated with a wearable can gather, process, display, and transmit and receive information.

POS data may be gathered at a POS terminal 117 that may interact with a mobile or wearable device 110 to track customer purchase history at a venue or preference for engagement at a particular locale within the venue. POE terminals 115 may provide data related to venue traffic flow, including entry and exit data that can be inclusive of time and volume. POE terminals 115 may likewise interact with mobile and wearable devices 110.

Historical data may also be accessed at databases 120 as a part of the application server 125 processing operation. The results of a processing or normalization operation may likewise be stored for later access and use. Processing and normalization results may also be delivered to front-end applications (and corresponding application servers) that allow for the deployment of contextual experiences and provide a network of services to remote devices as is further described herein.

The present system 100 may be used with and communicate with any number of external front-end devices 135 by way of communications network 130. Communication network 130 may be a local, proprietary network (e.g., an intranet) and/or may be a part of a larger wide-area network. Communication network 130 may include a variety of connected computing device that provide one or more elements of a network-based service. The communications network 130 may include actual server hardware or virtual hardware simulated by software running on one or more actual machines thereby allowing for software controlled scaling in a cloud environment.

Communication network 130 allows for communication between data sources 105 and front-end devices 135 via any number of various communication paths or channels that collectively make up network 130. Such paths and channels may operate utilizing any number of standards or protocols including TCP/IP, 802.11, Bluetooth, GSM, GPRS, 4G, and LTE. Communications network 130 may be a local area network (LAN) that can be communicatively coupled to a wide area network (WAN) such as the Internet operating through one or more network service provider.

Information received and provided over communications network 130 may come from other information systems such as the global positioning system (GPS), cellular service providers, or third-party service providers such as social networks. The system 100 can measure location and proximity using hardware on a user device (e.g., GPS) or collect the data from fixed hardware and infrastructure such as Wi-Fi positioning systems and Radio Frequency ID (RFID) readers. An exemplary location and proximity implementation may include a Bluetooth low-energy beacon with real time proximity detection that can be correlated to latitude/longitude measurements for fixed beacon locations.

Additional use cases may include phone-based, GPS, real-time location (latitude/longitude) measurements, phone geo-fence-real time notifications when a device is moving into or out of location regions, Wi-Fi positioning involving user location detection based on Wi-Fi signal strength (both active or passive), RFID/Near Field Communication (NFC), and cellular tower positioning involving wide range detection of user device location, which may occur at the metro-level.

Front-end devices 135 are inclusive of kiosks, mobile devices, wearable devices, venue devices, captive portals, digital signs, and POS and POE devices. It should be noted that each of these external devices may be used to gather information about one or more consumers at a particular location during a particular time. Thus, a device that is providing information to a customer on the front-end (i.e., a front-end device 135) such as a mobile device executing an application or a specially designed wearable can also function as a data source 105 as described above.

The system 100 of FIG. 1 provides services for dynamic journey mapping and recordkeeping. For example, a dynamic map including markers corresponding to various captured photos, recorded videos, transaction receipts, messages, social media posts, and other events may be generated at a mobile computing device 110, at one or more application server(s) 125, at one or more front-end-devices 135, or some combination thereof. Any of the devices illustrated in FIG. 1, including the mobile computing devices 110, application server(s) 125, and front-end devices 135 may include at least one computing system 700, or may include at least some of the components illustrated in FIG. 7.

Figure 2:
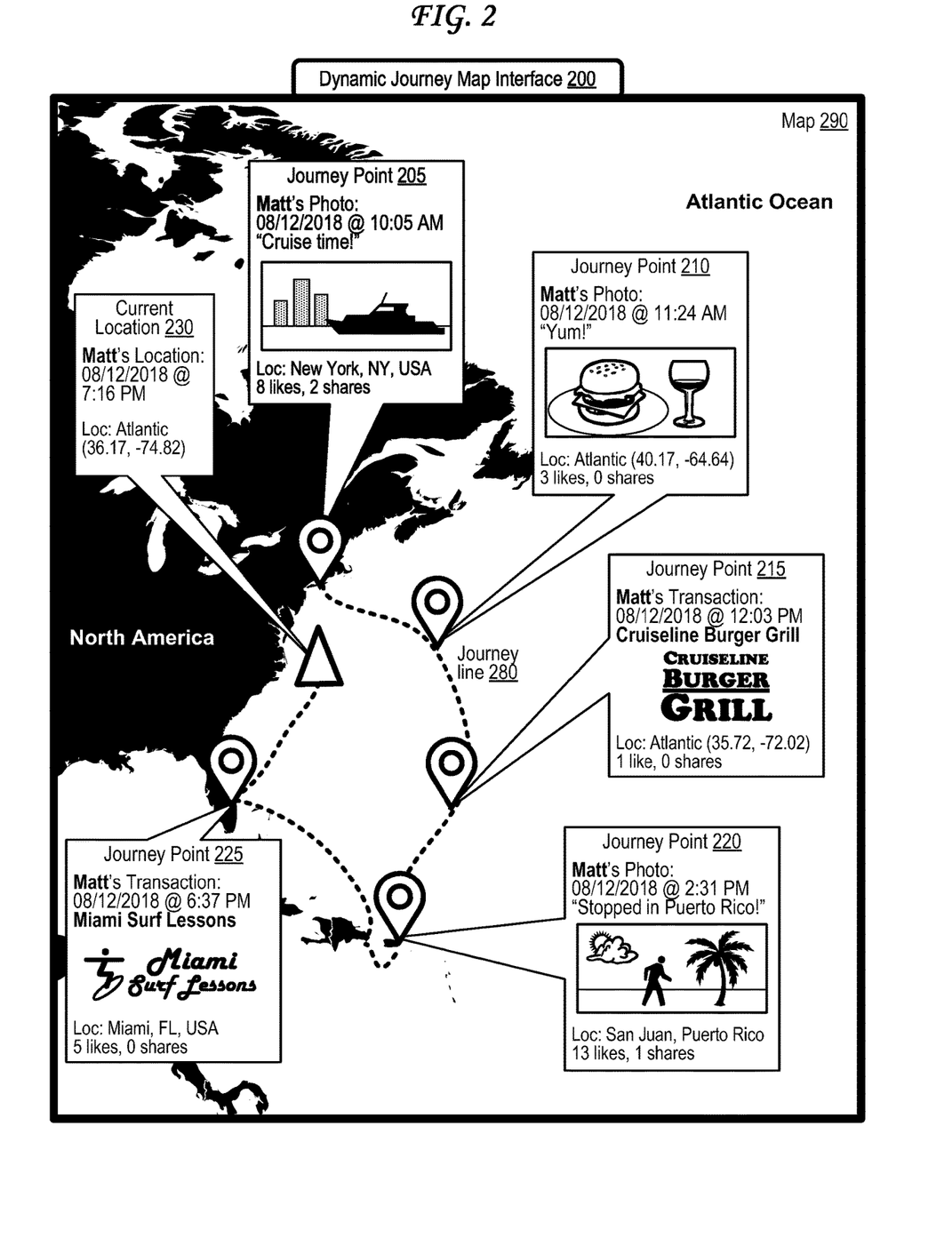
FIG. 2 illustrates a dynamic journey map interface with multiple records of a single user.

FIG. 2 illustrates a dynamic journey map interface with multiple records of a single user.

The dynamic journey map interface 200 of FIG. 2 illustrates a journey taken by a single user named Matt, which in this case is a cruise along the Atlantic Ocean. The route taken by Matt along his journey is illustrated a journey line 280, which is illustrated as a dashed line. There are multiple markers placed along the journey line 280, which each corresponds to a point in the journey at which a trigger condition of an acceptable trigger condition type was detected at a mobile computing device 110 associated with user Matt. For example, the markers illustrated in FIG. 2 correspond to photos captured by Matt's mobile computing device 110, to financial transactions associated with Matt, and to Matt's current location.

The dynamic journey map interface 200 of FIG. 2 is generated by overlaying the markers and the journey line 280 over a map 290, which in this case is a map of an eastern portion of North America and a portion of the Atlantic Ocean.

The first marker in Matt's journey corresponds to journey point 205, which was triggered by detection of Matt capturing a photo via his mobile computing device 110, or via a camera communicatively coupled to Matt's mobile computing device 110, at 10:05 AM on Aug. 12, 2018. This captured photo shows a boat, and Matt has added the caption "Cruise time!" to the photo. The capturing of the photo is detected at Matt's mobile computing device 110, which triggers a location detection at Matt's mobile computing device 110, for example using a GPS receiver of Matt's mobile computing device 110. The location at journey pint 205 is indicated to be New York city, New York, United States. The captured photo and caption may have been shared with other users via an existing social media platform or via a social media sharing feature, and the dynamic journey map interface 200 indicates that the captured photo has received 8 "likes" and 2 "shares" by users interacting with Matt's captured photo. The captured photo and the date, time, location, caption information, and social media interaction information are all associated with journey point 205 and it corresponding marker so as to be viewable via the dynamic journey map interface 200.

The next marker in Matt's journey corresponds to journey point 210, and was triggered by detection of Matt capturing another photo at 11:24 AM on Aug. 12, 2018 in the Atlantic Ocean at latitude/longitude coordinates 40.17, −64.64. This captured photo shows a hamburger and a glass of wine, and Matt has added the caption "Yum!" to the photo. Social media features integrated with the dynamic journey map interface 200 indicate that this photo has received 3 "likes" and 0 "shares."

The next marker in Matt's journey corresponds to journey point 215, and was triggered by detection of Matt completing a financial transaction at 12:03 PM on Aug. 12, 2018 in the Atlantic Ocean at latitude/longitude coordinates 35.72, −72.02. A record of this financial transaction is stored in the dynamic journey map interface 200 and indicated that the financial transaction was completed with merchant "Cruiseline Burger Grill." Social media features integrated with the dynamic journey map interface 200 indicate that this transaction has received 1 "like" and 0 "shares."

The next marker in Matt's journey corresponds to journey point 220, and was triggered by detection of Matt capturing another photo at 2:31 PM on Aug. 12, 2018 in San Juan, Puerto Rico. This captured photo shows a beach scene, and Matt has added the caption "Stopped in Puerto Rico!" to the photo. Social media features integrated with the dynamic journey map interface 200 indicate that this photo has received 13 "likes" and 1 "share."

The next marker in Matt's journey corresponds to journey point 225, and was triggered by detection of Matt completing a financial transaction at 6:37 PM on Aug. 12, 2018 in Miami, Fla., United States. A record of this financial transaction is stored in the dynamic journey map interface 200 and indicated that the financial transaction was completed with merchant "Miami Surf Lessons." Social media features integrated with the dynamic journey map interface 200 indicate that this transaction has received 5 "likes" and 0 "shares."

The next marker in Matt's journey corresponds to a "current" location 230 of Matt, which represents the most recent location identified by his mobile computing device 110.

This dynamic journey map interface 200 may support dynamic features such as user-controlled scrolling, user-controlled zooming, and automatic distorted scale. The dynamic journey map interface 200 may be divided into map sectors, each at a different scale, so that for example the map may appear more "zoomed in" at and/or near one or more selected marker(s) than it does at other points on the map 290 far away from the one or more selected marker(s). This conveys the benefit of allowing a viewer of the dynamic journey map interface 200 to see more map detail in more relevant areas, and less map detail in less relevant or irrelevant areas.

Figure 3:
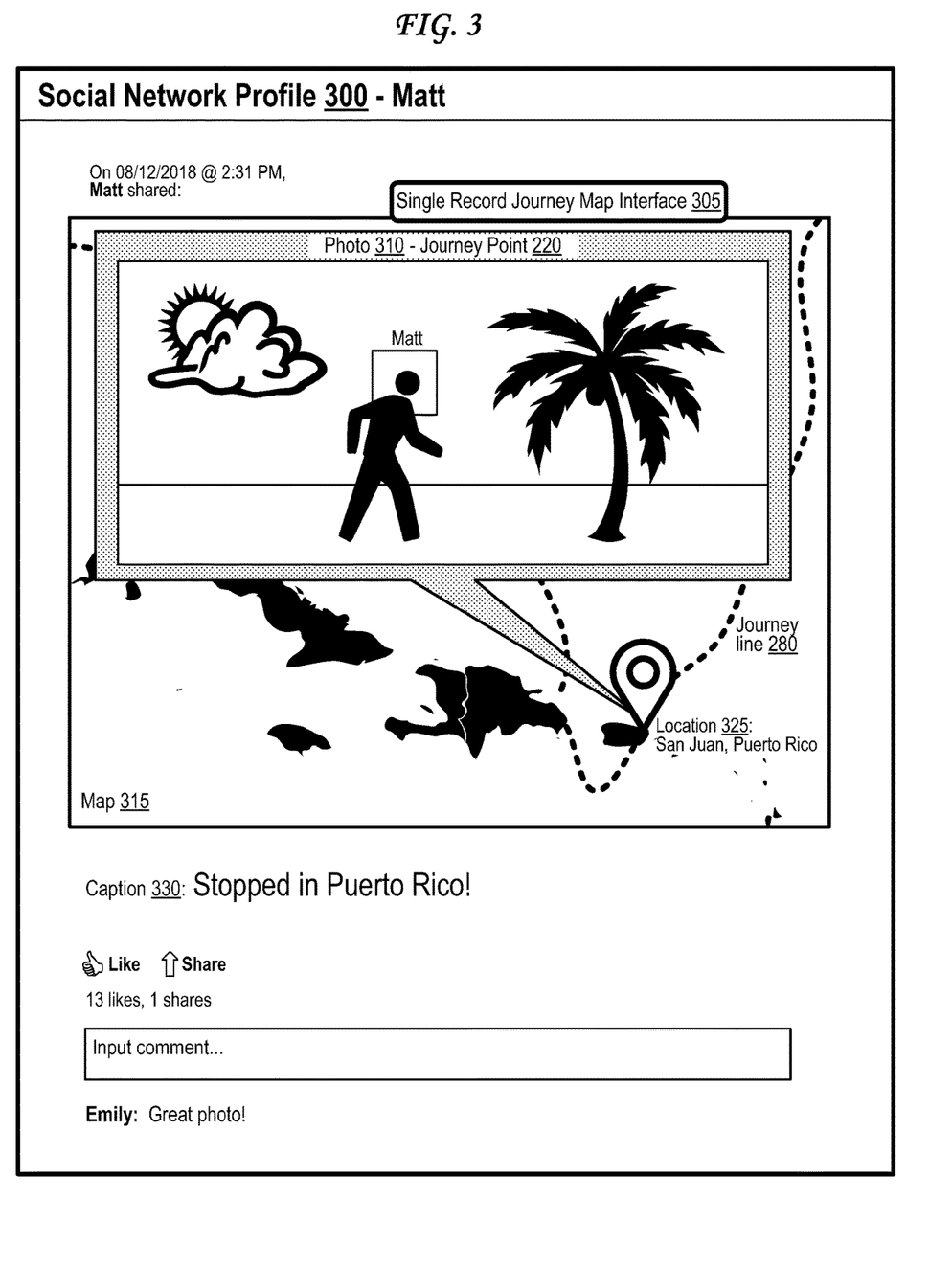
FIG. 3 illustrates a single record journey map interface within a social media platform interface.

FIG. 3 illustrates a single record journey map interface within a social media platform interface.

The single record journey map interface 305 is based on journey point 220 of FIG. 2 and includes a larger version of the same photo 310 that was illustrated in FIG. 2 with respect to journey point 220. This photo 310 is overlaid over a map 315 that is a zoomed-in and cropped version of the map 290 of the dynamic journey map interface 200 of FIG. 2, so that it only focuses on journey point 220. This photo 310 includes a depiction of a person. A box is drawn around the person's head, and "Matt" is written next to the box, indicating recognition that the person is Matt by a facial recognition algorithm of the social media platform, the dynamic journey map software, or some combination thereof.

The social media platform interface 300 of FIG. 3 indicates that Matt posted the single record journey map interface 305 at 2:31 PM on Aug. 12, 2018 in San Juan, Puerto Rico. The social media platform interface 300 also shows the caption 330 ("Stopped in Puerto Rico!"), and the 13 "likes" and 1 "share" that were also shown with respect to journey point 220 of the dynamic journey map interface 200 of FIG. 2. The social media platform interface 300 allows a viewer to also like or share the single record journey map interface 305, or to leave a comment, and illustrates one existing comment indicating that "Emily" wrote "Great photo!"

Figure 4:
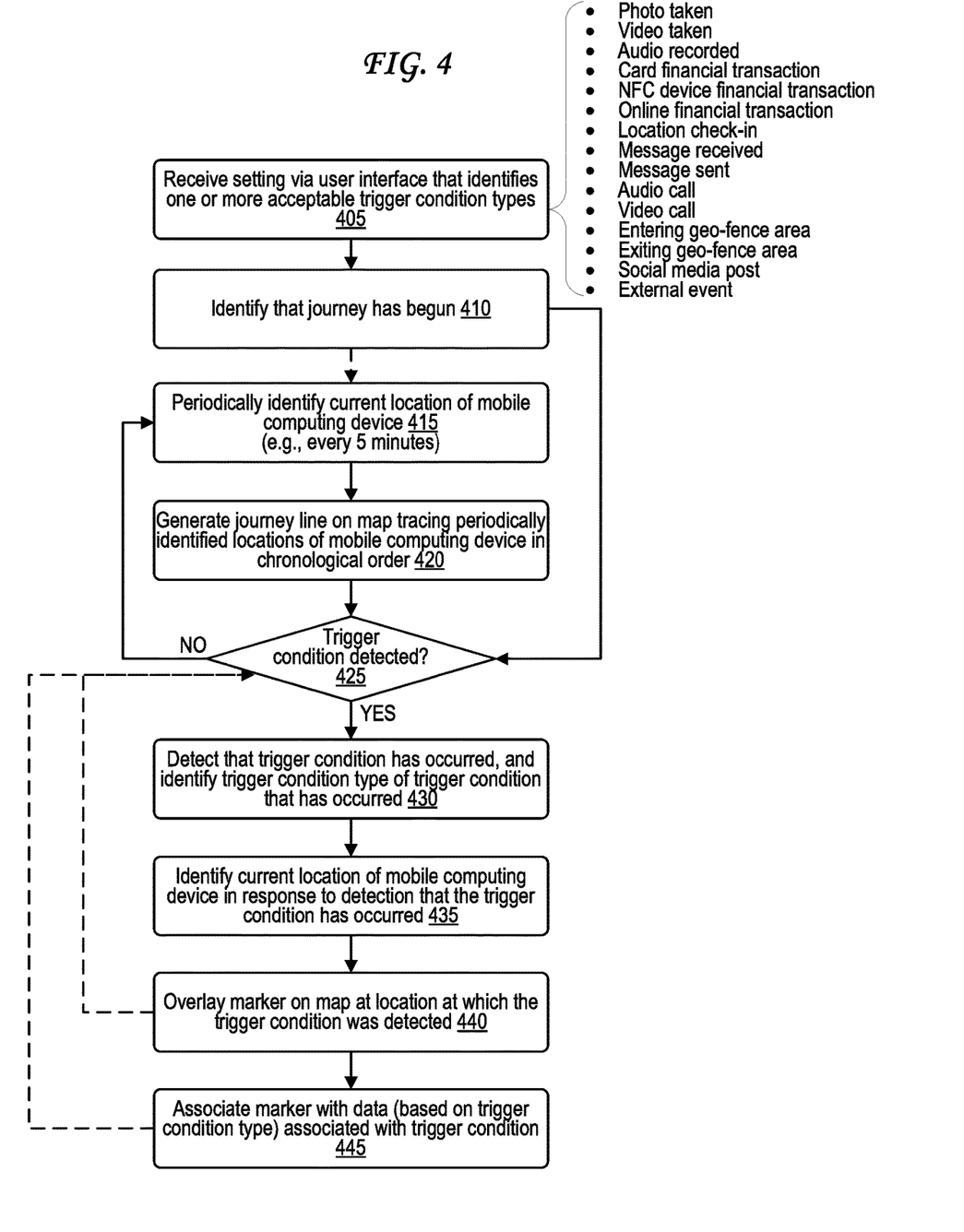
FIG. 4 is a flow diagram illustrating a process for generating a dynamic journey map interface.

FIG. 4 is a flow diagram illustrating a process for generating a dynamic journey map interface.

At step 405, a setting is received, identifying an acceptable trigger condition type of a plurality of possible trigger condition types. The setting may be input via a user interface of the mobile computing device 110.

Examples of possible trigger condition types include a photo trigger condition type in which capture of a photo is detected, a video trigger condition type in which recording of a video is detected, an audio trigger condition type in which recording of an audio recording is detected, an in-person card financial transaction trigger condition type in which in-person financial transaction via a credit or debit card is detected via information about the financial transaction being sent back to the mobile computing device 110, a near-field communication (NFC) device financial transaction trigger condition type in which in-person financial transaction via an NFC device such as the mobile computing device 110 or a connected wearable device is detected, an online financial transaction trigger condition type in which an online financial transaction using the mobile computing device 110 is detected, a location check-in trigger condition type in which a social media location check-in is detected, a message received trigger condition type in which receipt of a message is detected, a message sent trigger condition type in which sending of a message is detected, an audio call trigger condition type in which connection of an audio call is detected, a video call trigger condition type in which connection of an video call is detected, a geofence entry trigger condition in which entry of the mobile computing device 110 into a geofence area is detected, a geofence exit trigger condition in which exit of the mobile computing device 110 from a geofence area is detected, a social media trigger condition in which a social media post by the mobile computing device 110 onto a social media platform is detected, an external event trigger condition type in which an event at an external system other than the mobile computing device 110 is detected, or some combination thereof. Social media platforms can include, for example, Facebook, Twitter, Snapchat, Instagram, LinkedIn, or Pinterest. External events can include, for example, a database record being updated in a database, a database record being added to a database, a database record being removed from a database. External events can include a facial recognition system at a device other than the mobile device 110 recognizing a face, such as a face of the user associated with the mobile computing device 110, within a live or stored photo or video. External events can require multiple devices other than the mobile device 110 to reach particular trigger conditions.

Any of these trigger condition types that involve a second party/device may be limited to being triggered only when the second party/device is a predetermined second party/device, or only when the second party/device is a predetermined type of second party/device. For example, the financial transaction trigger condition types can be customized to trigger only for financial transactions with a particular party, or with a certain class of party, such as restaurants or entertainment venues. The message received trigger condition type can be customized trigger only when the sender is one of a set of pre-determined senders. The message sent trigger condition type can be customized trigger only when the recipient is one of a set of pre-determined recipients. The audio/video call trigger condition type can be customized trigger only when the other party on the call is one of a set of pre-determined parties. Photo/video/audio trigger condition types can be customized to trigger only when a facial recognition algorithm recognizes one of a set of pre-determined acceptable faces in the photo or video, or when a voice recognition algorithm recognizes one of a set of pre-determined acceptable voices in the video or audio.

At step 410, the journey is identified as begun. The beginning of the journey may be identified based on a user input or based on detection of a trigger condition as in step 412. In some cases, a location of the mobile computing device 110 may be identified in response to identification of the beginning of the journey so that the beginning of the journey can be marked by a marker or by the beginning of a journey line, such as the journey line 280 of the dynamic journey map interface 200 of FIG. 2. After step 410, either step 415 or step 425 may follow.

At step 415, a location of the mobile computing device 110 is periodically detected by the mobile computing device 110 and identified. The location may be detected periodically based on an interval, for example every 10 seconds, every 30 seconds, every minute, every 5 minutes, every 10 minutes, every 30 minutes. The location may alternately be monitored and identified in real-time.

At step 420, a journey line is generated by tracing along the periodically identified locations of the mobile computing device 110 in chronological order.

At step 425, the mobile computing device 110 checks to see whether a trigger condition of the one or more acceptable trigger condition types identified in step 405 has been detected. If no such trigger condition is detected, the process proceeds with step 415. If such a trigger condition is detected, the process proceeds with step 430.

At step 430 the trigger condition is detected, and the trigger condition type is identified. For example, if the acceptable trigger condition types are the photo trigger condition type and the NFC device financial transaction trigger condition type, then at step 430, the mobile device 110 may detect that a photo was taken and that therefore a trigger condition has occurred, and that the trigger condition was of the photo trigger condition type.

At step 435, the location of the mobile computing device 110 is determined in response to the detection of the trigger condition at step 430. At step 440, a marker is overlaid over a map at the location determined at step 435. At this point, the process may optionally return to step 425, or may proceed to step 445.

At step 445, the marker is associated with the data associated with the trigger condition, based on the trigger condition type. For example, the marker can be associated with a captured photo for the photo trigger condition type; the marker can be associated with a recorded video for the video trigger condition type; the marker can be associated with a recorded audio for the audio trigger condition type; the marker can be associated with a transaction party and/or transaction amount for any of the financial transaction trigger condition types; the marker can be associated with a location and social media platform for a location check-in trigger condition type; the marker can be associated with a message and a sender for a message received trigger condition type; the marker can be associated with a message and a recipient for a message sent trigger condition type; the marker can be associated with a call duration and/or call party for an audio or video call trigger condition type; the marker can be associated with an identified geofence area for a geofence entry or exit trigger condition type; the marker can be associated with a message and a social media platform for a social media post trigger condition type; the marker can be associated with data from an external device other than the mobile computing device 110 for an external event trigger condition type; or some combination thereof. At this point, the process may optionally return to step 425.

It should be understood that any of the steps of FIG. 4 can be performed at the mobile computing device 110, at one or more application server(s) 125, or some combination thereof.

Examples or templates may be provided for assisting individuals in capturing visual media content, such as displaying visual elements that can be combined with photography, video or the like captured by a user's camera to provide multi-media content that conveys elements captured by the camera with other visual content, such as content describing the location (e.g., a map with a star on the user's location), content depicting activities (such as cartoons), and other visual elements. These may be merged automatically in the platform and stored in a multimedia data structure, such as one defined by a class of objects with properties and attributes that characterize the user-captured content and other properties and attributes that characterize template content, so that the platform can perform operations on both, such as for recommendations, personalization, and other purposes.

Figure 5:
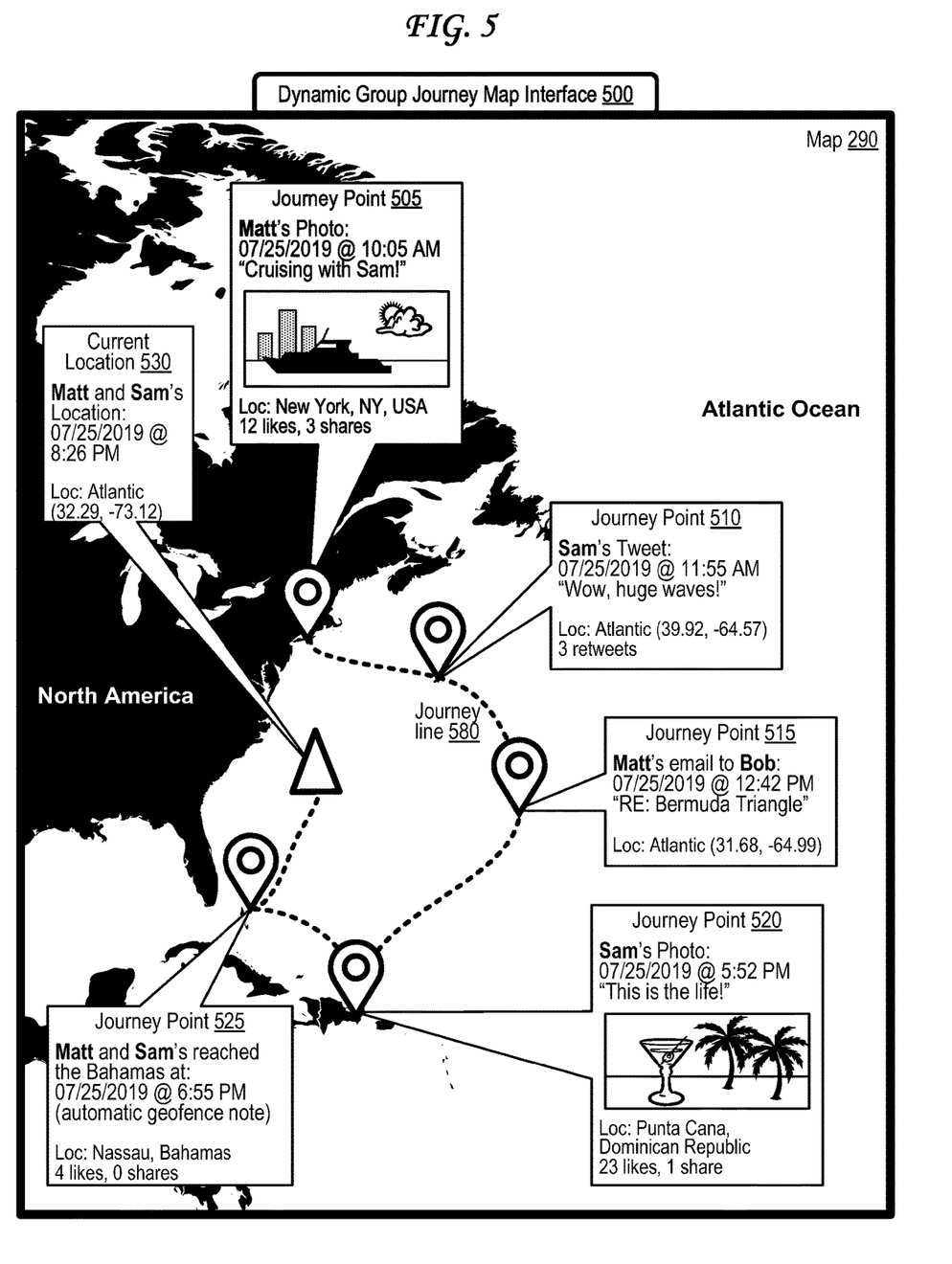
FIG. 5 illustrates a dynamic group journey map interface with multiple records of multiple users.

FIG. 5 illustrates a dynamic group journey map interface with multiple records of multiple users.

The dynamic group journey map interface 500 of FIG. 5 illustrates a journey taken together by a first user, Matt, and a second user, Sam. Data from Matt's mobile computing device 110 and from Sam's mobile computing device 110 are both used to produce the dynamic group journey map interface 500. In the dynamic group journey map interface 500, a journey line 550, and corresponding markers, are overlaid over the map 290 of North America and the Atlantic Ocean.

The first marker in Matt and Sam's journey corresponds to journey point 505, and was triggered by detection of Matt capturing a photo at 10:05 AM on Jul. 25, 2019 in New York city, New York, USA. This captured photo shows a boat, and Matt has added the caption "Cruising with Sam!" to the photo. Social media features integrated with the dynamic group journey map interface 500 indicate that this photo has received 12 "likes" and 3 "shares."

The next marker in Matt and Sam's journey corresponds to journey point 510, and was triggered by detection of Sam posting a "tweet" post to Twitter 11:55 AM on Jul. 25, 2019 in on the Atlantic Ocean at latitude/longitude coordinates (39.92, −64.57). A record of this tweet is stored in the dynamic group journey map interface 500 and indicates that the tweet read "Wow, huge waves!" Social media features integrated with the dynamic group journey map interface 500 indicate that this tweet has received 3 "retweets."

The next marker in Matt and Sam's journey corresponds to journey point 515, and was triggered by detection of Matt sending an email to Bob at 12:42 PM on Jul. 25, 2019 in on the Atlantic Ocean at latitude/longitude coordinates (31.68, −64.99). A record of this tweet is stored in the dynamic group journey map interface 500 and indicates that the subject line of the email is "RE: Bermuda Triangle."

The first marker in Matt and Sam's journey corresponds to journey point 520, and was triggered by detection of Sam capturing a photo at 5:52 PM on Jul. 25, 2019 in Puna Cana, Dominican Republic. This captured photo shows a drink and some palm trees, and Sam has added the caption "This is the life!" to the photo. Social media features integrated with the dynamic group journey map interface 500 indicate that this photo has received 23 "likes" and 1 "share."

The next marker in Matt and Sam's journey corresponds to journey point 515, and was triggered by a geofence detection of Matt and Sam's mobile computing devices 110 reaching a geofence area corresponding to the Bahamas at 7:55 PM on Jul. 25, 2019 around Nassau in the Bahamas. A record of this automatic geofence notification is stored in the dynamic group journey map interface 500. Social media features integrated with the dynamic group journey map interface 500 indicate that this photo has received 4 "likes" and 0 "share."

The next marker in Matt and Sam's journey corresponds to a "current" location 530 of Matt and Sam, which represents the most recent locations identified by Matt's mobile computing device 110 and Sam's mobile computing device 110, or at least whichever is most recent.

Figure 6:
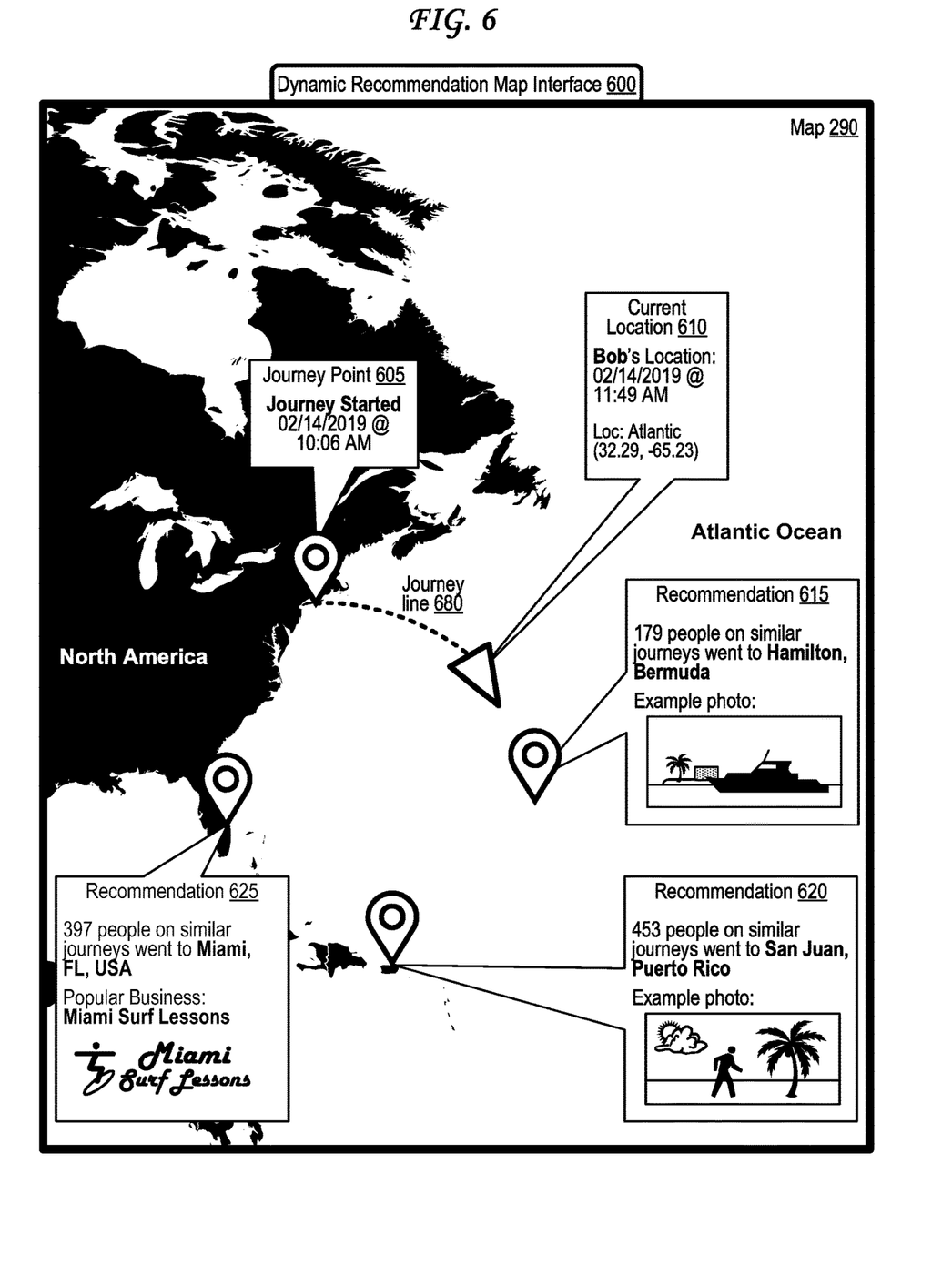
FIG. 6 illustrates a dynamic recommendation map interface with multiple recommended locations based on previous journeys.

FIG. 6 illustrates a dynamic recommendation map interface with multiple recommended locations based on previous journeys.

The dynamic recommendation map interface 600 of FIG. 5 illustrates a journey taken by a user, Bob. Data from Bob's mobile computing device 110 is used to produce the start point 605 and journey line 680, which are overlaid over the map 290 of North America and the Atlantic Ocean. Bob's current location 610 is shown via a marker and associated information that indicates that, as of 11:49 AM on Feb. 14, 2019, Bob was in the Atlantic Ocean at latitude/longitude coordinates (32.29, −65.23).

The dynamic recommendation map interface 600 of FIG. 5 overlays a number of markers over the map 290 that indicate recommended locations for Bob to visit based on his current journey line 680 and based on records of previous journeys at Bob's mobile computing device 110, the application server(s) 125, or some combination thereof. Recommendations can be based on records of previous journeys by Bob or other by users, and in particular can be based on records of previous journeys following the at least a subset of the same route/journey line as Bob's current journey, previous journeys that went to at least a subset of the locations that have already been visited or are planned along Bob's current journey, previous journeys a same or adjacent region as Bob's current journey, previous journeys by friends or contacts of Bob.

The first recommendation marker corresponds to recommendation 615, which is identified as Hamilton, Bermuda. The data associated with this recommendation identifies that 179 people on similar trips went to this location. An example photo from one of these previous trips is shown.

The next recommendation marker corresponds to recommendation 620, which is identified as San Juan, Puerto Rico. The data associated with this recommendation identifies that 453 people on similar trips went to this location. An example photo from one of these previous trips—namely, photo 315 from Matt's trip in FIG. 2 and FIG. 3—is shown.

The next recommendation marker corresponds to recommendation 625, which is identified as Miami, Fla. The data associated with this recommendation identifies that 397 people on similar trips went to this location. A popular business is also identified, namely "Miami Surf Lessons."

The recommendation markers listed in the dynamic recommendation map interface 600 can be based on a number of numeric values stored about previous trips. For example, as depicted in FIG. 6, a number of visitors to each particular location on previous trips/journeys can be tracked. Visitors on previous trips can be asked to rate each location, either as a binary like/dislike rating or as a numeric rating out of a predetermined maximum score. Visitors on previous trips can be asked to provide text-based reviews and/or photos of the locations. The language in the text-based reviews can then be parsed to locate a number of negative words, such as "bad" or "horrible," and a number of positive words, such as "great" or "wonderful," and thereby determine numbers of "positive reviews" or "negative reviews" based on whether there are more positive words or negative words in each review. All of this numerical data can be stored in a data structure, such as a database, on the mobile computing device 110, the application server(s) 125, on some external device accessible to the mobile computing device 110 and/or the application server(s) 125, or some combination thereof.

In some cases, a location can be recommended only when one or more of these numeric values exceeds a corresponding threshold value. For example, a location can be recommended when the number of visitors to the location on past trips exceeds a predetermined threshold number of visitors, when the average rating of the location by visitors on past trips exceeds a predetermined threshold average rating, when the difference between a number of positive ratings and a number of negative ratings exceeds a rating difference threshold, when an average "positiveness" of the text-based reviews exceeds a predetermined review positiveness threshold, when a number of positive reviews exceeds a number of negative reviews by a review difference threshold, or some combination thereof.

Recommendations can also be based on average wait times in queues when locations are associated with queues. For example, when a location is a restaurant, concession stand, ski lift, or amusement park ride, an average wait time can be tracked based on how long previous users waited in a queue, which can be counted by mobile computing devices 110 of those users, by application server(s) 125 communicating with proximity beacons near the locations, by application server(s) 125 communicating with cameras that track line movement via image recognition, by staff members at those locations, or some combination thereof. Average wait time can be tied to time and date. For example, each location can be associated with an average wait time on a Monday, Tuesday, Wednesday, Thursday, Friday, Saturday, and Sunday, at different increments during the day. In some cases, a location can be recommended only when the average wait time at a current time or at an estimated time of arrival is below a predetermined threshold wait time.

Content captured with respect to a journey, or an event within a journey, may be used to form a recommendation, such as for a friend, a contact, or member of a user's group or cohort, or for another individual or group that has similar demographic or psychographic characteristics. This may include individuals or groups that are undertaking an itinerary that has shared waypoints with a user's journey, or that can be directed to shared locations or waypoints. Thus, the content captured for a journey may be fed to the recommendation engine that generates the recommendation, and the recommendation engine can process the information to provide or refine recommendations. Recommendations can be enhanced using content captured from journeys, such as by showing pictures of users undertaking recommended activities that are available for the user receiving the recommendation.

Each of these numeric values and threshold determinations may be made at the mobile computing device 110, at the application server(s) 125, or some combination thereof.

Figure 7:
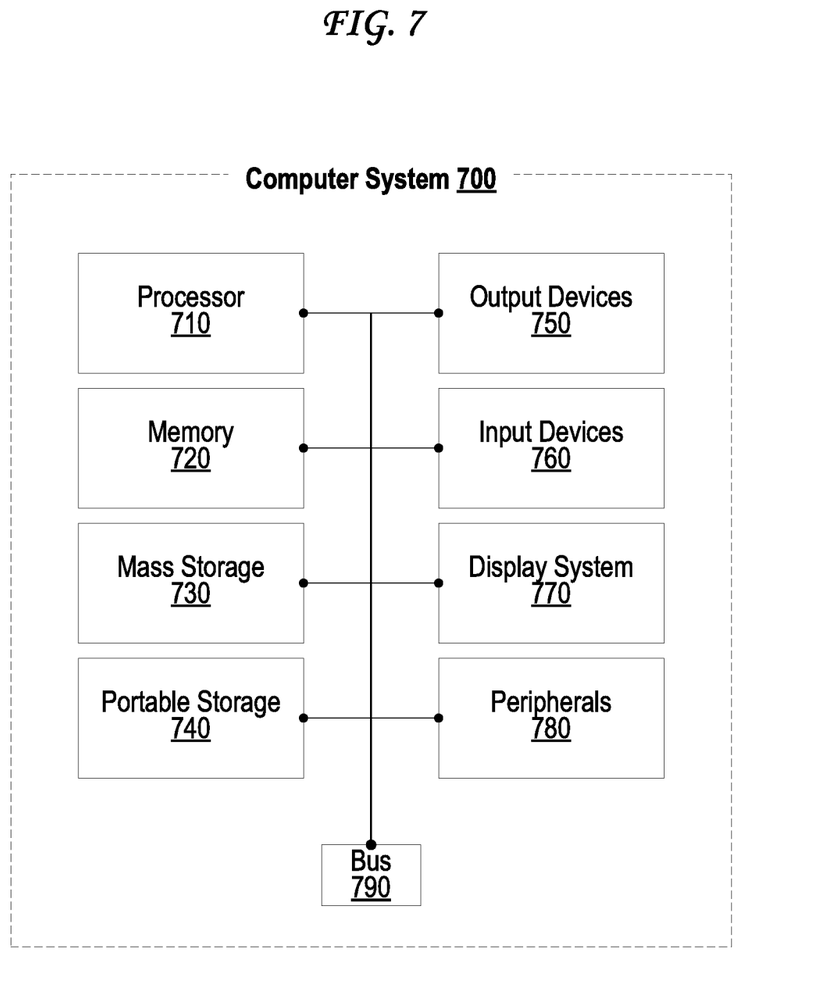
FIG. 7 is a block diagram of an exemplary computing device that may be used to implement an embodiment of the present invention.

FIG. 7 illustrates an exemplary computing system 700 that may be used to implement an embodiment of the present invention. For example, any of the computer systems or computerized devices illustrated in FIG. 1 or otherwise described herein may, in at least some cases, include at least one computing system 700, or may include at least some of the components illustrated in FIG. 7. The computing system 700 of FIG. 7 includes one or more processors 710 and memory 710. Main memory 710 stores, in part, instructions and data for execution by processor 710. Main memory 710 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 710 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 710.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD), a plasma display, an organic light-emitting diode (OLED) display, an electronic ink display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 700 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 700 may be part of a multi-computer system that uses multiple computer systems 700, each for one or more specific tasks or purposes. For example, the multi-computer system may include multiple computer systems 700 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 700 from different networks communicatively coupled together via the internet (also known as a "distributed" system).

The present invention may be implemented in an application that may be operable using a variety of devices. Non-transitory computer-readable storage media refer to any medium or media that participate in providing instructions to a central processing unit (CPU) for execution and that may be used in the memory 720, the mass storage 730, the portable storage 740, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, any other magnetic medium, flash memory, memristor memory, any other solid-state memory, a CD-ROM disk, digital video disk (DVD), blu-ray disk (BDD), or any other optical medium, Random Access Memory (RAM), Read-Only Memory (ROM), programmable read-only memory (PROM), erasable programmable read-only memory (EPROM), electrically erasable programmable read-only memory (EEPROM), FLASHEPROM, Resistive random-access memory (RRAM or ReRAM), Phase Change Memory (PCM), spin transfer torque RAM (STT-RAM), and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of mapping journey information, the method comprising:
    storing information defining a trigger condition as occurring when a mobile computing device performs an action;
    identifying that the trigger condition has occurred by identifying that the mobile computing device has performed the action, wherein the action includes output by the mobile computing device of media data captured by one or more sensors of the mobile computing device and associated with the trigger condition;
    receiving the media data captured by the one or more sensors of the mobile computing device and associated with the trigger condition, and associated information, from the mobile computing device;
    identifying, in response to identifying that the trigger condition has occurred, a first location of the mobile computing device at which the media data is captured by the one or more sensors of the mobile computing device;
    generating a map of a geographic region that includes the first location of the mobile computing device; and
    generating a dynamic map at least in part by overlaying a first marker on the map at the first location of the mobile computing device at which the media data is captured by the one or more sensors of the mobile computing device, by overlaying a record interface over the map, the record interface including the media data captured by the one or more sensors of the mobile computing device and associated with the trigger condition, the record interface including the associated information, and by visually associating the first marker with the media data associated with the trigger condition via the record interface, wherein the record interface with the media data captured by the one or more sensors of the mobile computing device and associated with the trigger condition and the associated information is viewable at the first marker via the dynamic map.

2. The method of claim 1, wherein output by the mobile computing device of the media data associated with the trigger condition includes output of a photo by the mobile computing device, wherein the media data associated with the trigger condition includes the photo.

3. The method of claim 1, wherein output by the mobile computing device of the media data associated with the trigger condition includes output of a video by the mobile computing device, wherein the media data associated with the trigger condition includes the video.

4. The method of claim 1, wherein output by the mobile computing device of the media data associated with the trigger condition includes output of receipt data associated with a financial transaction involving a user associated with the mobile computing device, wherein the media data associated with the trigger condition includes the receipt data.

5. The method of claim 1, wherein output by the mobile computing device of the media data associated with the trigger condition includes transmission of a message from the mobile computing device to a secondary computing device other than the mobile computing device, wherein the media data associated with the trigger condition includes the message.

6. The method of claim 1, wherein output by the mobile computing device of the media data associated with the trigger condition includes uploading of a social media post to a social media platform, wherein the media data associated with the trigger condition includes at least a portion of the social media post.

7. The method of claim 1, wherein output by the mobile computing device of the media data associated with the trigger condition includes output of an audio recording by the mobile computing device, wherein the media data associated with the trigger condition includes the audio recording.

8. The method of claim 1, further comprising identifying that a journey associated with a user associated with the mobile computing device has begun by identifying a second location of the mobile computing device before identifying the first location of the mobile computing device and by placing a second marker on the map at the second location of the mobile computing device, the second marker identifying a starting point of the journey.

9. The method of claim 1, further comprising identifying a plurality of locations of the mobile computing device over a duration of a journey, wherein at least a subset of the plurality of locations are identified periodically based on a pre-determined interval.

10. The method of claim 1, further comprising:
identifying a plurality of locations of the mobile computing device over a duration of a journey, the plurality of locations including the first location;
generating a journey line connecting the plurality of locations according to an order that the plurality of locations were identified; and
overlaying the journey line over the map.

11. The method of claim 1, further comprising transmitting the dynamic map to the mobile computing device.

12. The method of claim 1, further comprising:
identifying a plurality of locations of the mobile computing device over a duration of a journey, the plurality of locations including the first location;
identifying a route of the journey based on the plurality of locations;
identifying a similarity between the route of the journey and a previous route of a previous journey; and
identifying a recommended location for a user associated with the mobile computing device to visit based on the similarity, wherein the recommended location is located along the previous route of the previous journey.

13. The method of claim 1, further comprising:
identifying that a second trigger condition has occurred by identifying that a second mobile computing device has performed a second action, wherein the second action includes output by the second mobile computing device of secondary media data generated at the second mobile computing device and associated with the second trigger condition;
receiving the secondary media data associated with the second trigger condition from the second mobile computing device;
identifying a second location of the second mobile computing device in response to identifying that the second trigger condition has occurred; and
modifying the dynamic map by overlaying a second marker on the map at the second location of the second mobile computing device, and by associating the second marker with the secondary media data associated with the second trigger condition, so that the secondary media data associated with the second trigger condition is viewable at the second marker.

14. The method of claim 1, wherein output by the mobile computing device of media data captured by one or more sensors of the mobile computing device includes transmission of the media data from the mobile computing device following capture of the media data by the one or more sensors.

15. A system for mapping journey information, the system comprising:
a communication interface communicatively coupled to a mobile computing device via a network connection, the mobile computing device associated with a first user;
a memory that stores instructions; and
a processor, wherein execution of the instructions by the processor causes the processor to:
access stored information defining a trigger condition as occurring when the mobile computing device performs an action,
identify that the trigger condition has occurred by identifying that the mobile computing device has performed the action, wherein the action includes output by the mobile computing device of media data captured by one or more sensors of the mobile computing device and associated with the trigger condition and associated information,
identify the media data associated with the trigger condition,
identify, in response to identifying that the trigger condition has occurred, a first location of the mobile computing device at which the media data is captured by the one or more sensors of the mobile computing device,
generate a map of a geographic region that includes the first location of the mobile computing device, and
generate a dynamic map at least in part by overlaying a first marker on the map at the first location of the mobile computing device at which the media data is captured by the one or more sensors of the mobile computing device, by overlaying a record interface over the map, the record interface including the media data captured by the one or more sensors of the mobile computing device and associated with the trigger condition, the record interface including the associated information, and by visually associating the first marker with the media data associated with the trigger condition via the record interface, wherein the record interface with the media data captured by the one or more sensors of the mobile computing device and associated with the trigger condition and the associated information is viewable at the first marker via the dynamic map.

16. The system of claim 15, wherein output by the mobile computing device of the media data associated with the trigger condition includes output of a visual media by the mobile computing device, wherein the media data associated with the trigger condition includes the visual media.

17. The system of claim 15, wherein output by the mobile computing device of the media data associated with the trigger condition includes output of receipt data associated with a financial transaction involving a user associated with the mobile computing device, wherein the media data associated with the trigger condition includes the receipt data.

18. The system of claim 15, wherein output by the mobile computing device of the media data associated with the trigger condition includes uploading of a social media post to a social media platform, wherein the media data associated with the trigger condition includes at least a portion of the social media post.

19. The system of claim 15, wherein the communication interface is communicatively coupled to a second mobile computing device via the network connection, the second mobile computing device associated with a second user, and wherein execution of the instructions causes the processor to:

identify that a second trigger condition has occurred by identifying that the second mobile computing device has performed a second action, wherein the second action includes output by the second mobile computing device of secondary media data generated at the second mobile computing device and associated with the second trigger condition,     receive the secondary media data associated with the second trigger condition from the second mobile computing device,     identify a second location of the second mobile computing device in response to identifying that the second trigger condition has occurred, and     modify the dynamic map by overlaying a second marker on the map at the second location of the second mobile computing device, and by associating the second marker with the secondary media data associated with the second trigger condition, so that the secondary media data associated with the second trigger condition is viewable at the second marker.

20. A non-transitory computer readable storage medium having embodied thereon a program, wherein the program is executable by a processor to perform a method of mapping journey information, the method comprising:

storing information defining a trigger condition a occurring when a mobile computing device performs an action;

identifying that the trigger condition has occurred by identifying that the mobile computing device has performed the action, wherein the action includes output by the mobile computing device of media data captured by one or more sensors of the mobile computing device and associated with the trigger condition;

receiving the media data captured by the one or more sensors of the mobile computing device and associated with the trigger condition, and associated information, from the mobile computing device;

identifying, in response to identifying that the trigger condition has occurred, a first location of the mobile computing device at which the media data is captured by the one or more sensors of the mobile computing device;

generating a map of a geographic region that includes the first location of the mobile computing device; and     generating a dynamic map at least in part by overlaying a first marker on the map at the first location of the mobile computing device at which the media data is captured by the one or more sensors of the mobile computing device, by overlaying a record interface over the map, the record interface including the media data captured by the one or more sensors of the mobile computing device and associated with the trigger condition, the record interface including the associated information, and by visually the first marker with the media data associated with the trigger condition via the record interface, wherein the record interface with the media data captured by the one or more sensors of the mobile computing device and associated with the trigger condition and the associated information is viewable at the first marker via the dynamic map.

\* \* \* \* \*